US012062510B2

(12) United States Patent
Kesarkar et al.

(10) Patent No.: US 12,062,510 B2
(45) Date of Patent: Aug. 13, 2024

(54) SWITCH WITH ACTUATOR

(71) Applicant: Eaton Intelligent Power Limited, Dublin (IE)

(72) Inventors: Shailesh Kesarkar, Curtorim (IN); Alistair Stevens, Loughborough (GB); Varsha Sabale, Pune (IN); Roger Burkett, Swindon (GB); Asad Mujawar, Pune (IN)

(73) Assignee: EATON INTELLIGENT POWER LIMITED, Dublin (IE)

( * ) Notice: Subject to any disclaimer, the term of this patent is extended or adjusted under 35 U.S.C. 154(b) by 280 days.

(21) Appl. No.: 17/640,366

(22) PCT Filed: Sep. 4, 2020

(86) PCT No.: PCT/EP2020/074725

§ 371 (c)(1),
(2) Date: Mar. 4, 2022

(87) PCT Pub. No.: WO2021/043959

PCT Pub. Date: Mar. 11, 2021

(65) Prior Publication Data

US 2022/0328268 A1 Oct. 13, 2022

(30) Foreign Application Priority Data

Sep. 5, 2019 (IN) ............................. 201911035836
Nov. 20, 2019 (GB) ...................................... 1916867

(51) Int. Cl.
*H01H 39/00* (2006.01)
*H01H 9/02* (2006.01)

(52) U.S. Cl.
CPC ............ *H01H 39/006* (2013.01); *H01H 9/02* (2013.01)

(58) Field of Classification Search
CPC .. H01H 39/006; H01H 9/02; H01H 2039/008; H01H 33/06; H01H 33/04; H01H 33/42
See application file for complete search history.

(56) References Cited

U.S. PATENT DOCUMENTS 4,224,487 A * 9/1980 Simonsen ............ H01H 39/006 200/61.08
5,929,740 A * 7/1999 Oh ..................... H01H 85/0417 337/198

(Continued)

*Primary Examiner* — Stephen S Sul
(74) *Attorney, Agent, or Firm* — LEYDIG, VOIT & MAYER, LTD.

(57) ABSTRACT

A switch includes: an actuator; a conductor having a length extending between two ends and a width extending between two sides, the conductor having a connection contact at either end and at least one switching region disposed between the connection contacts, each switching region extending between two sides of the conductor and including: a hole through the conductor, at least one shearable portion bounded by the hole and a nearest of the two sides of the conductor, and an insert conductor inserted into the hole and in electrical contact with the conductor, via the hole, such that a current conduction path is defined along the length of the conductor via the insert conductor and the at least one shearable portion of each switching region; and a moveable member aligned with the at least one switching region and arranged to move in a first direction.

15 Claims, 10 Drawing Sheets

(56) References Cited

U.S. PATENT DOCUMENTS

| | | | | |
|---|---|---|---|---|
| 6,556,119 | B1 | 4/2003 | Lell | |
| 7,123,124 | B2 * | 10/2006 | Caruso | H01H 39/006 200/61.08 |
| 2005/0083165 | A1 * | 4/2005 | Tirmizi | H01H 39/006 337/157 |
| 2012/0194954 | A1 * | 8/2012 | Fukuyama | H01H 39/006 361/62 |
| 2013/0009745 | A1 | 1/2013 | Hentschel | |
| 2015/0200065 | A1 | 7/2015 | Koetter et al. | |
| 2017/0263402 | A1 * | 9/2017 | Lorenzon | H01H 11/00 |
| 2017/0263403 | A1 | 9/2017 | Marlin et al. | |
| 2021/0350991 | A1 * | 11/2021 | Fukuda | H01H 39/006 |

* cited by examiner

100

SWITCH WITH ACTUATOR

CROSS-REFERENCE TO PRIOR APPLICATIONS

This application is a U.S. National Phase application under 35 U.S.C. § 371 of International Application No. PCT/EP2020/074725, filed on Sep. 4, 2020, and claims benefit to Indian Patent Application No. IN 201911035836, filed on Sep. 5, 2019, and to British Patent Application No. GB 1916867.3, filed on Nov. 20, 2019. The International Application was published in English on Mar. 11, 2021 as WO 2021/043959 under PCT Article 21(2).

FIELD

This relates to opening, or interrupting, a current conduction path. In particular, this relates to a switch including an actuator for opening a current conduction path, and a method for operating a switch.

BACKGROUND

Current conduction paths can be opened by breaking a continuous conductor which defines the current conduction path. One approach is to use a switch comprising an actuator, in some examples a pyrotechnic based actuator, to break the continuous conductor. When switches are used for high current applications, the size of the conductor may be large in order to carry the high current. It may therefore be difficult to break such a large continuous conductor.

It is desirable to provide an improved switch apparatus for opening a current conduction path, particularly in high current applications. Such an improved apparatus is desirable for applications which require reliable and rapid opening of a current conduction path, for example, batteries in electric vehicles or electrical overload mechanisms for industrial processes requiring high current ratings.

SUMMARY

In an embodiment, the present invention provides a switch, comprising: an actuator; a conductor having a length extending between two ends and a width extending between two sides, the conductor having a connection contact at either end and at least one switching region disposed between the connection contacts, each switching region extending between two sides of the conductor and comprising: a hole through the conductor, at least one shearable portion bounded by the hole and a nearest of the two sides of the conductor, and an insert conductor inserted into the hole and in electrical contact with the conductor, via the hole, such that a current conduction path is defined along the length of the conductor via the insert conductor and the at least one shearable portion of each switching region; and a moveable member aligned with the at least one switching region and arranged to move in a first direction toward the at least one switching region upon actuation by the actuator, wherein, when the moveable member moves in the first direction, the moveable member is configured to at least partially displace the insert conductor from the hole with a first end portion of the moveable member and then shear the at least one shearable portion of the conductor with a respective second end portion of the moveable member in order to break the current conduction path, and wherein the first end portion extends farther in the first direction than the respective second end portion.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following:

FIG. 2.

FIG. 3.

FIG. 6.

FIG. 9.

DETAILED DESCRIPTION

Figure 1:
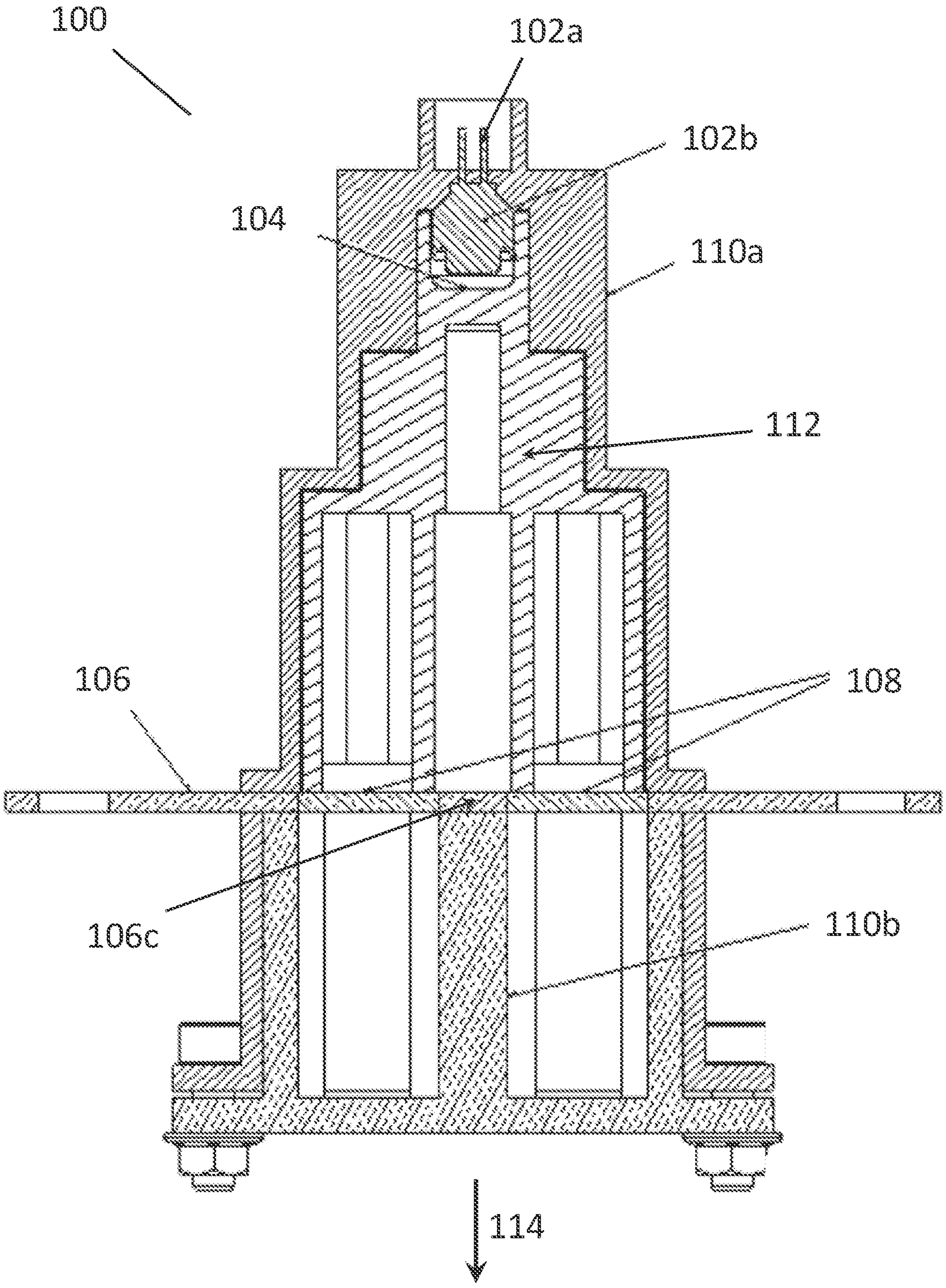
FIG. 1 shows a schematic cross section of a switch in accordance with an embodiment of the first aspect, where the switch is in a closed position and a current conduction path is defined through the switch.

In an embodiment, the present invention provides a switch as described herein. In an embodiment, the present invention provides a method of operating the switch described herein.

In the following specification, a switch for opening a current conduction path is described. The switch comprises: an actuator; and a conductor having a length extending between two ends and a width extending between two sides, the conductor having a connection contact at either end and at least one switching region disposed between the connection contacts. Each switching region extends between the two sides of the conductor and comprises: a hole through the conductor, at least one shearable portion bounded by the hole and a nearest of the two sides of the conductor, and an insert conductor inserted into the hole and in electrical contact with the conductor, via the hole, such that a current conduction path is defined along the length of the conductor via the insert conductor and the at least one shearable portion of each switching region. The switch comprises a moveable member aligned with the at least one switching region and arranged to move in a first direction toward the at least one switching region upon actuation by the actuator, wherein, when the moveable member moves in the first direction, the moveable member is configured to at least partially displace the insert conductor from the hole with a first end portion of the moveable member and then shear the at least one shearable portion of the conductor with a respective second end portion of the moveable member in order to break the current conduction path, wherein the first end portion extends further in the first direction than the respective second end portion.

Optionally, the insert conductor may be at least partially retained in the respective hole by interference fit, optionally by press fit. Additionally or alternatively, the insert conductor may be at least partially retained in the respective hole with solder. Additionally or alternatively, the insert conductor may be at least partially retained in the respective hole with electrically conductive adhesive.

Previous actuator based switches have relied on a linear arrangement to break a single, or continuous, conductor. For example, a linear displacement of an actuated piston would cut the conductor into two segments under a wedge type action to interrupt the current. This arrangement may be suitable for some low current applications. However, for higher current applications, the conductor to be broken is typically thicker or wider and therefore high forces are required in order to break the conductor. By inserting and retaining the insert conductors within the holes with a temporary joint, and then displacing the insert conductors before breaking a main body of the conductor at the shearable portion(s) of the switching region(s), sufficient electrical contact can be maintained to provide a current conduction path across the whole conductor in general use. In addition, mechanical stability of the conductor is maintained by the shearable portion(s) during the initial displacement operation. At the same time, quick and easy opening of the current conduction path may be achieved once the actuator is actuated without requiring large forces to be applied to the conductor. Smaller actuators may therefore be used, facilitating the provision of smaller and cheaper switches.

The separation of the insert conductors and shearable portions from the main body of the conductor can also facilitate a reduction in the electric arc (or arc discharge) formed when the different conductors separate from one other. In particular, the displacement of the insert conductors and shearable portions in response to the actuation (i.e. the linear translation of the moveable member and thus of the insert conductors and shearable portions) can rapidly stretch the arc, increasing the arc resistance. An increased arc resistance causes a corresponding increase in arc voltage and a decrease in arc current (since electrical arcs exhibit negative resistance). With the physical separation between the conductor portions which is achievable with the switch of the first aspect, the arc resistance can be quickly increased with time, and the current correspondingly reduced to such a value that heat formed by the current passing through the air is not sufficient to maintain the arc—the arc is thus extinguished.

Optionally, the at least one switching region comprises two switching regions separated from one another along the length of the conductor. Optionally, the moveable member comprises two extensions, each extension being aligned with a respective one of the two switching regions, the first end portion and the second end portion being arranged at an end of each of the two extensions. By breaking the conductor in multiple places (i.e. at each switching region), multiple arc columns can be created; the electrical arc can be distributed across each column, which reduces the severity of each individual arc column and increases the rate of suppression. As such, a more effective interruption of the electrical arc can be provided. A safer and more robust switch may therefore be provided.

Optionally, the switch further comprises a housing arranged to enclose at least the two switching regions, wherein a portion of the conductor between the two switching regions member is supported by the housing. By supporting the conductor from the bottom whilst applying a shear force to the top, more effective and efficient transfer of force from the moveable member may be provided. A smaller actuator may therefore be used, reducing the size and cost of the switch. Assembly and manufacture may also be easier and more efficient with such a construction, since structural support of the conductor can be provided whilst the switch is being assembled.

Optionally, the actuator is a pyrotechnic actuator, and the switch further comprises an ignition chamber. The pyrotechnic actuator can be arranged to release gas into the ignition chamber upon ignition to actuate the moveable member. Optionally, the moveable member comprises a void which at least partially defines the ignition chamber. The moveable member can be directly actuated and act like a piston to displace the insert conductors and shear the shearable portions. When the ignition chamber is at least partially defined by the void in the moveable member (or piston), a smaller ignition chamber may be provided (at least initially, it will be understood that the ignition chamber will expand in size as the piston moves). Fewer explosives may therefore be required to produce a desired pressure on the piston, which can provide for a more efficient switch.

As discussed above, for higher current applications the conductor to be broken is typically thicker or wider and therefore high forces are required in order to break the conductor.

Previous pyrotechnic based switches (or automatic pyrotechnic based circuit breakers) have therefore typically utilized large pyrotechnic actuators, which leads to costly and bulky switch arrangements. By using separate conductor pieces to form the conductor, which are joined only with a temporary joint provided by pushing the insert conductors into a hole in the main body of the conductor, leaving only a narrow portion of the conductor main body around each hole, significantly smaller forces are required to break the electrical contact of the different conductors and open the current conduction path.

This can lead to smaller and cheaper switches suitable for a range of current loads.

Optionally, the moveable member is configured such that the first end portion fully displaces the insert conductor from the respective hole before the second end portion contacts the at least one shearable portion of each switching region. Optionally, the at least one shearable portion is further bounded by one or more notched portions of the conductor, the notched portions extending in a direction across the width of the conductor. Optionally, the at least one shearable portion has a cross sectional area smaller than a cross sectional area of the conductor outside of the at least one switching region. Optionally, the at least one switching region comprises two shearable portions, one disposed either side of the hole. Each of these arrangements allows the conductor to be broken under application of a smaller force, since the conductor may be more easily sheared at the shearable portions. Smaller actuators may be therefore be used, facilitating the provision of smaller and cheaper switches for higher current ratings.

A system is provided comprising a switch as described above and a controller arranged to provide a signal to the actuator to actuate the actuator. Such a system may be used in any suitable application where a switch (or automatic circuit breaker, where an activation trigger is provided) is required, such as for overload in industrial applications, for example.

A vehicle is provided comprising a switch as described above. Optionally, the vehicle may further comprise a controller arranged to provide a signal to the actuator to ignite the actuator. Optionally, the vehicle is an electric vehicle. The switch may be used, for example, to break a circuit in a battery of the vehicle in case of an accident. This may improve safety.

In the following specification, a method for operating a switch is described. The method is optionally a method for operating the switch of the first aspect. The method comprises: actuating an actuator; exerting, by the actuator, pressure on a moveable member aligned with a switching region of a conductor, the switching region extending between two sides of the conductor, the moveable member arranged to move in a first direction toward the switching region upon actuation by the actuator (i.e. arranged to move in response to the pressure exerted by the actuator); at least partially displacing, with a first end portion of the moveable member (as the moveable member moves in the first direction), an insert conductor inserted into a hole through the conductor at the switching region; shearing, with a respective second end portion of the moveable member, at least one shearable portion of the switching region, the at least one shearable portion bounded by the hole and a nearest of the two sides of the conductor, wherein the first end portion extends further in the first direction than the second end portion; opening a current conduction path defined along a length of the conductor via the insert conductor and the at least one shearable portion by the displacement of the insert conductor and the shearing of the at least one shearable portion.

Optionally, the actuator comprises a pyrotechnic actuator. In such an arrangement, actuating the actuator comprises igniting the pyrotechnic actuator to release gas into an ignition chamber; and the method comprises exerting pressure on the moveable member in dependence on the released gas (to move the moveable member and thus display the insert conductor). Optionally, the moveable member comprises a void which at least partially defines the ignition chamber.

It will be understood that any of the features described above with reference to the switch of the first aspect may be provided in any suitable combination. Moreover, any such features may be combined with any features of the method of the second aspect, or vice-versa, as appropriate.

Figure 2A:
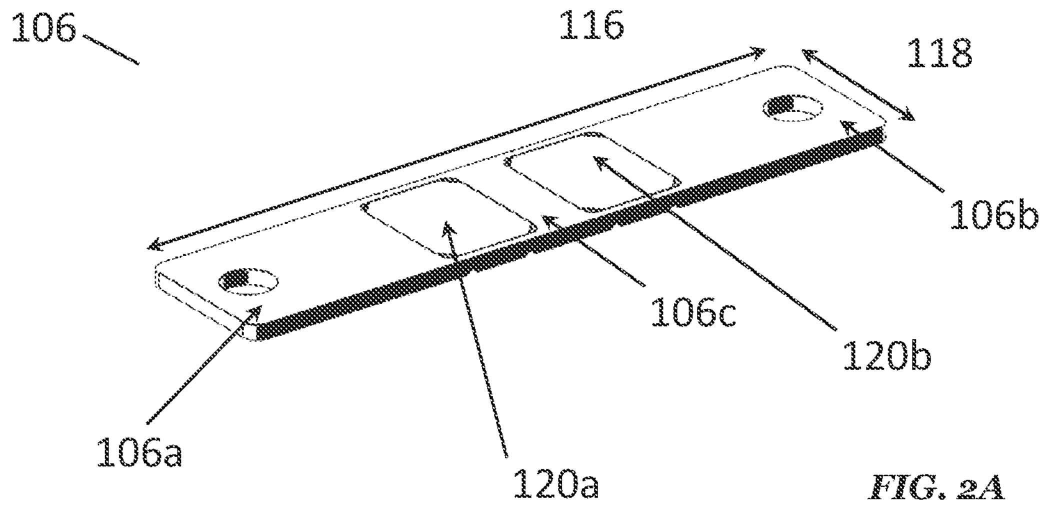
FIG. 2A shows a perspective view of the conductor of the switch of FIG. 1A
Figure 2B:
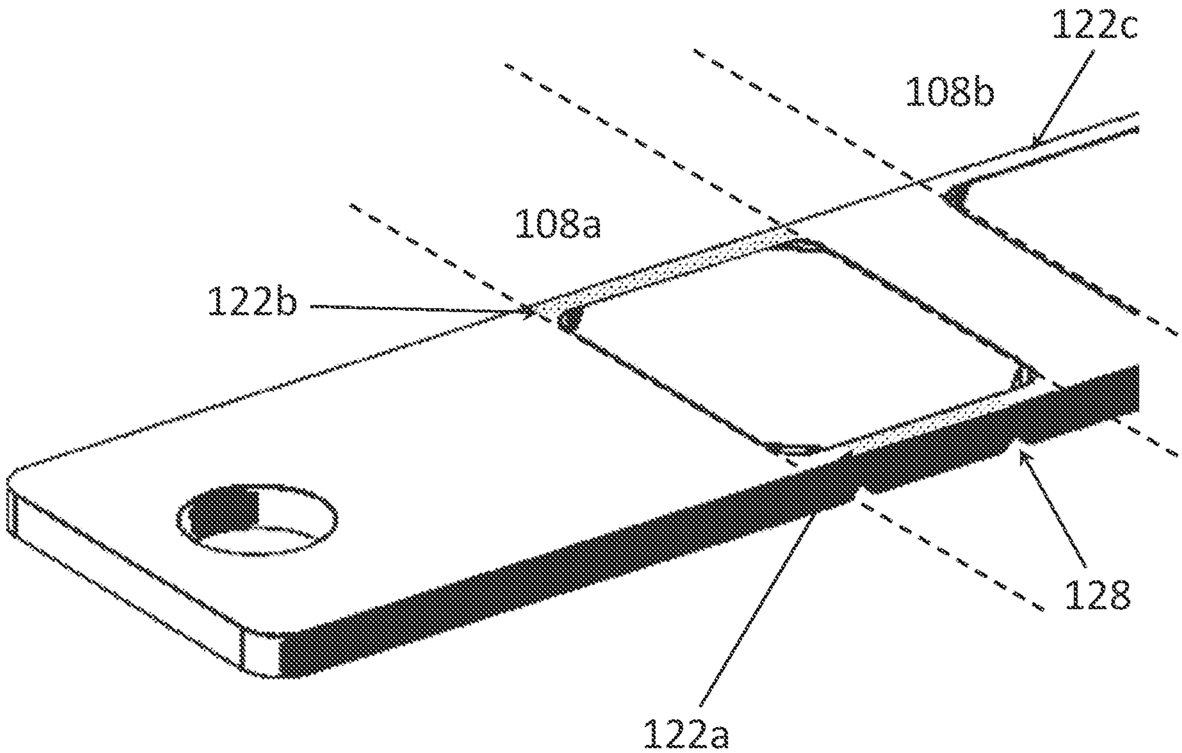
FIG. 2B shows a detail perspective view of the conductor of FIG. 2A.

With reference to FIG. 1 and FIG. 2 (FIGS. 2A and 2B), a switch 100 for opening a current conduction path is described. The current conduction path is defined along a conductor 106, where conductor 106 comprises a main body and one or more additional portions or regions disposed along the main body, as described below.

Figure 3A:
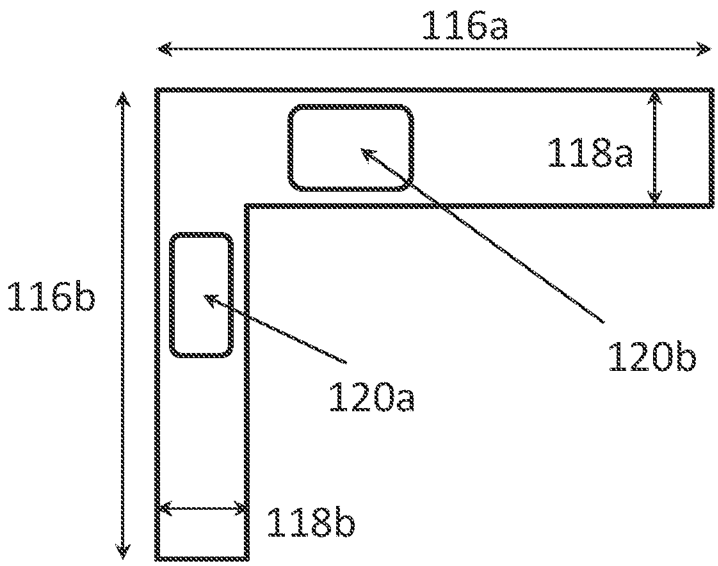
FIGS. 3A and 3B show other example arrangements for a conductor of the switch of the first aspect.

Conductor 106 comprises a main body (formed of an electrically conductive material) having two ends and sides extending between the two ends. Conductor 106 as described herein has connection contacts 106*a*, 106*b* formed at either end of the conductor 106, but the connection contacts of the conductor can be comprised of additional components electrically connected to the conductor 106, as appropriate. The main body of the conductor has a length 116 which extends between the two ends of the conductor 106, and a width 118 which extends between two sides of the conductor 106. In the embodiments described herein the main body of the conductor 106 is rectangular, but it will be understood that any suitable geometry may be used for conductor 106. In one example, described with reference to FIG. 3A, the conductor may be L-shaped, where the length extends between the two ends of the L-shaped conductor (total of lengths 116*a* and 116*b*) and a conductor width (or widths, since 118*a* and 118*b* may be the same or different) is correspondingly defined. Similarly, the conductor may be square, or may be, for example, oval (where the length can be defined as the extension of the conductor across the semi major axis and the width can be defined as the extension of the conductor across the semi minor axis, or vice versa, as appropriate). Before the switch is actuated, the current conduction path is defined along the length 116 and across the whole width 118 of the conductor 106.

Conductor 106 comprises at least one switching region 108. In the following examples two switching regions 108*a*, 108*b* are described, but it will be understood that only one switching region 108 may be provided, or more than two switching regions 108 may be provided, as appropriate to the size and switching requirements of switch 100 (which can be based upon, for example, the current carrying capacity of the conductor). The at least one switching region 108 is disposed between the connection contacts 106*a*, 106*b* along the length 116 of the conductor 106. The switching regions 108 are separated with respect to one another, such that a section of conductor 106*c* is disposed between each respective switching region 108.

Switch 100 comprises a housing 110 (here including top, or outer, portion 110*a* and bottom, or inner, portion 110*b*), the housing 110 arranged to enclose the at least one switching region 108, and at least a portion of the rest of conductor 106. The connection contacts 106*a*, 106*b* of conductor 106 are provided outside of housing 110, for connection of switch 100 to one or more electrical circuits.

Figure 4:
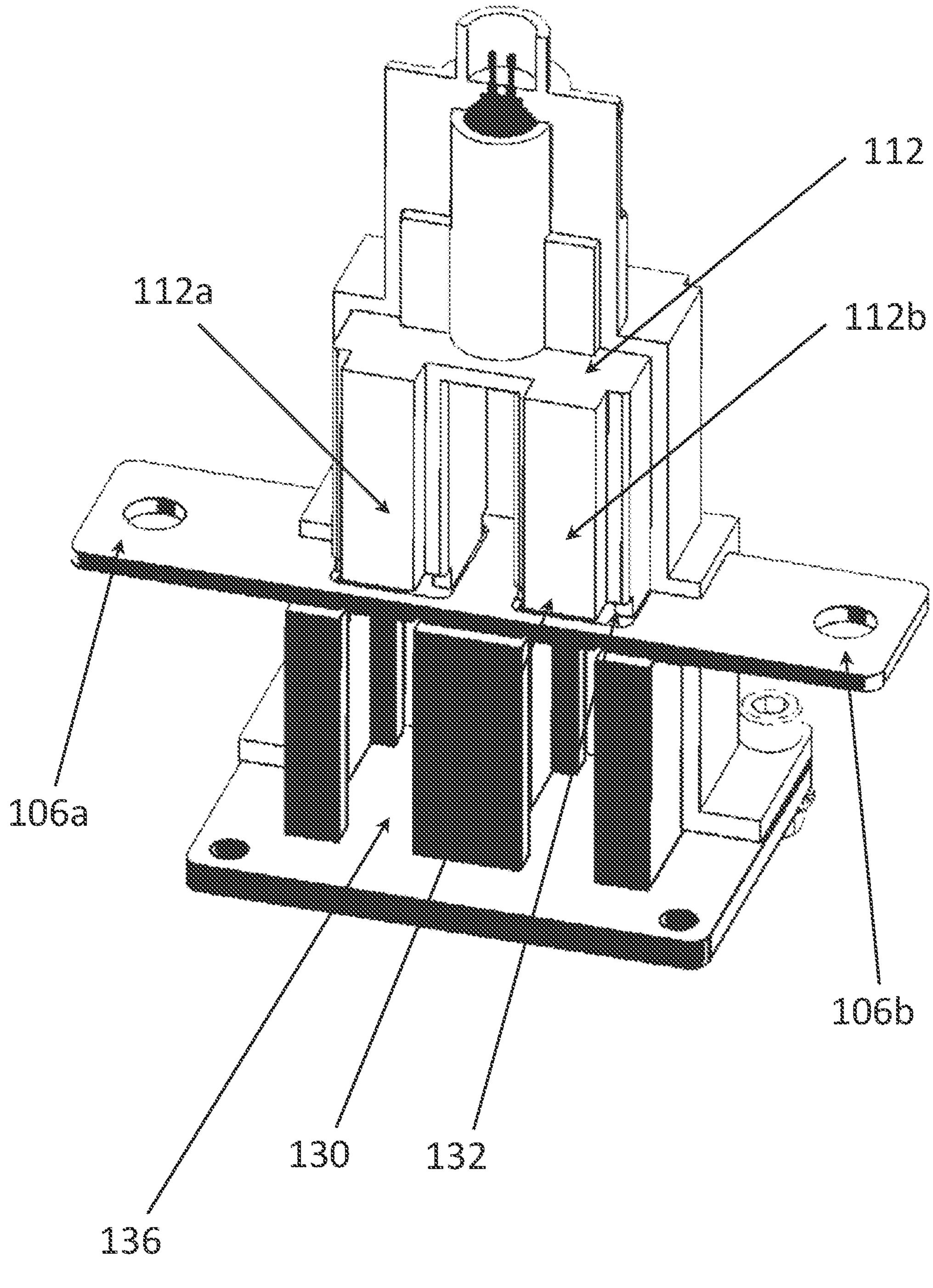
FIG. 4 illustrates a perspective view of an interior of the switch of FIG. 1.

With further reference to FIG. 2, each switching region 108*a*, 108*b* of conductor 106 extends between the two sides of the conductor (i.e. extends across the full width 118 of the main body of the conductor 106). Each switching region 108 comprises a hole 124 extending through the conductor 106 (which can be further seen with reference to FIGS. 4 and 6B) and an insert conductor 120 inserted into the hole (where the insert conductor is formed of an electrically conductive material, optionally the same material as the main body of the conductor). In some examples the conductor 106 comprises copper, but any other suitable conducting material may be used to form conductor 106. The hole extends the entire way through the thickness of the conductor main body, and the insert conductor 120 is here the same thickness as the conductor main body such that the inserted insert conductor 120 is substantially flush with the conductor main body. The two insert conductors 120*a*, 120*b*, are each arranged to be in electrical contact with the conductor 106, via the respective holes, such that current can flow along the length 116 and across the whole width 118 of the conductor via the insert conductors 120*a*, 120*b*. By replacing the portion of conductor 106 removed by creating hole 124 with an insert conductor 120 substantially the same size and shape, the current carrying capabilities of the conductor 106 may be unaffected.

The insert conductors 120*a*, 120*b* may be retained within the respective holes 124 by interference fit, optionally by push fit. In other words, the insert conductors 120 are in physical contact with the edges of the holes 124 in order to achieve the electrical contact with the main body of the conductor 106. In other example embodiments, the insert conductors 120*a*, 120*b* may be retained within the respective holes 124 by the use of solder or an electrically conductive adhesive. In other words, the insert conductors 120 may not be in direct physical contact with the edges of the holes 124, but are still in electrical contact with the edges of the holes 124, in order to achieve the requisite electrical contact with the main body of the conductor 106.

Each switching region 108 further comprises at least one shearable portion 122. The shearable portions as described herein are portions of the conductor 106 which are arranged to be broken away from the rest of the main body of the conductor by shear, i.e. through the application of a shear force. In particular, the shearable portions are regions of the main body of the conductor which are disposed between the hole 124 and a conductor side; as described herein, each shearable portion 122 is bounded by the hole 124 and a nearest of the two sides of the conductor between which the width 118 is defined. The shearable portions are illustrated in FIG. 2B as dotted portions of conductor 106; in this example, one shearable portion 122*b* extends across the whole of the switching region and one shearable portion 122*a* is further bounded by notched portions 128 of conductor 106, which will be described below in more detail.

Figure 3B:
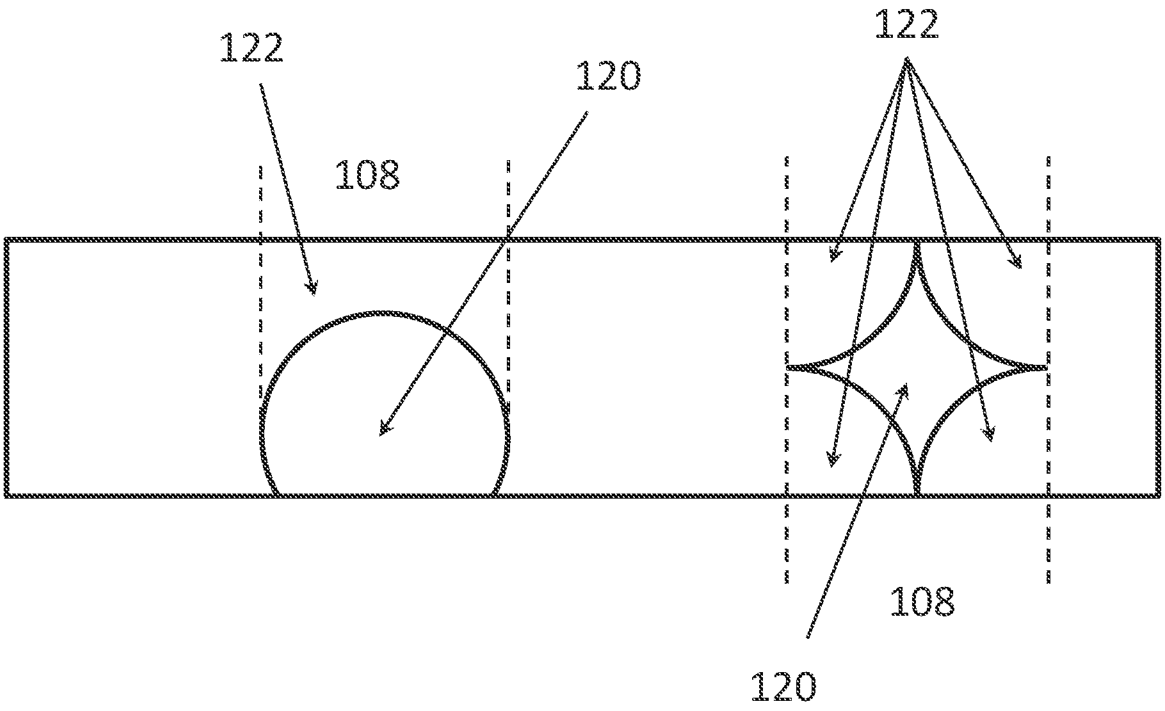

In these example embodiments, two shearable portions 122*a*, 122*b*, are arranged within each switching region 108*a*, 108*b*, one arranged at either side of each hole 124. However, there may be only one shearable portion 122, or there may be more than two shearable portions 122, depending on the shape of hole 124. Such other example arrangements are illustrated in FIG. 3B, where a portion of conductor 106 is shown. The shearable portion(s) 122 are bounded by the hole 124 and a nearest side of the conductor and arranged such that the current conduction path is defined along the length 116 of the conductor through both the insert conductor 120 and the at least one shearable portion 122 of each switching region 108, such that the current conduction path can extend across the whole, or substantially the whole, width 118 of the conductor.

Figure 5:
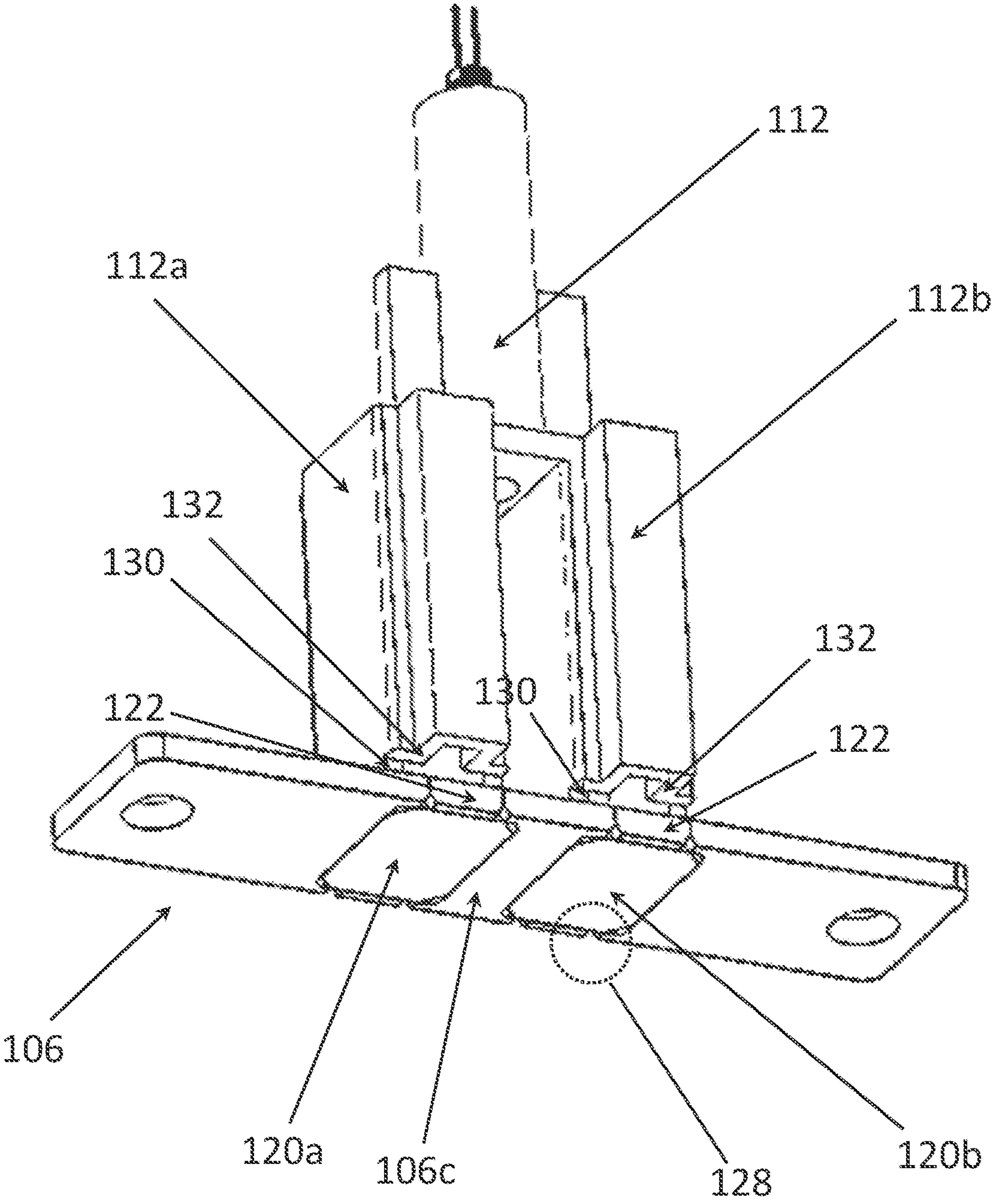
FIG. 5 illustrates a perspective view of the conductor and a moveable member of the switch of FIG. 1.

With reference to FIG. 1, switch 100 further comprises a moveable member 112 aligned with the at least one switching region 108 and arranged to move in a first direction 114 toward the at least one switching region 108 upon actuation by an actuator 102 of the switch 100. As described with reference to FIGS. 4 and 5, the movable member 112 comprises one or more first end portions 130 and one or more second end portions 132. The first end portion(s) 130 protrude further along direction 114 than the second end portion(s) 132 such that, upon actuation of the movable member 112, the first end portion contacts conductor 106 at the switching region 108 before the second end portion contacts the conductor 106 at the switching region. In other words, the end of the movable member 112 nearest the conductor 106 can be configured to have a stepped arrangement so that different regions of the at least on switching region are sequentially contacted by the moveable member 112. In particular, the moveable member can be configured such that the middle portion 106*c* of the conductor 106 can be retained and supported by the housing 110*b* upon actuation, while the insert conductors 120 and the shearable portions 122 are sequentially displaced by the movable member 112 towards the base 136 of the switch 110.

When the conductor comprises two switching regions 108*a*, 108*b*, as described herein, the movable member 112 can comprise two extensions 112*a*, 112*b*. Each extension 112*a*, 112*b* is aligned with a respective one of the two switching regions 108*a*, 108*b*, the first end portions and the second end portions being arranged at an end of each of the two extensions. The extensions of the movable member can be configured to be received within the bottom portion of the housing 110*b*, as can be seen with respect to FIG. 4, such that when the movable member 112 is fully actuated the end portions of the two extensions 112*a*, 112*b* are at or near a base 136 of the switch 100. The extensions of the moveable member are in this example separated from one another, such that the middle portion 106*c* of the conductor may be retained between the two extensions.

As described herein, actuator 102 may be any suitable type of actuator. In some examples actuator 102 is a pyrotechnic actuator, but another form of electrically actuated actuator, or a manually operated actuator, may be used to move the moveable member 112. It will be understood that the type of actuator used may be dependent on a thickness of the conductor 106, since this thickness affects the force required to be applied to break the current conduction path, as will be described below.

When actuator 102 is a pyrotechnic actuator, the actuating force is provided by, upon ignition of the pyrotechnic actuator, a release of gas. In particular, the pyrotechnic actuator 102 comprises connector pins 102*a* and an igniter 102*b*. The connector pins 102*a* activate a charge inside the igniters 102*b* upon receipt of an ignition signal. The pyrotechnic actuator 102 is arranged to, upon activation or ignition of the charge, expel gas into an ignition chamber 104. In these example embodiments, the moveable member 112 is arranged as a piston, the piston comprising a cavity or void which at least partially defines the ignition chamber 104. However, it will be understood that the ignition chamber 104 may be provided independently of the movable member (for example, it may be defined by a void provided within the housing 110), and the moveable member may then be indirectly actuated by the actuator 102.

The high-pressure gases which are expelled into the ignition chamber 104 produce an actuating force which acts on the moveable member 112 to cause the movable member to move from a first position (shown in FIG. 1) towards a second position in a direction of movement 114 towards the base 136 of the switch 100 (where, in the second position, the extensions of movable member 112 are at or near the base of the switch within housing portion 110*b*). The pyrotechnic actuator is arranged to release gas into the ignition chamber 104 in a direction substantially parallel to the direction of movement 114 of the moveable member to actuate the moveable member 112. When another form of actuator is used, the actuator 102 can be arranged to apply a linear force in a direction substantially parallel to the direction of movement 114, or any other suitable force in any other suitable direction, to actuate the moveable member in direction 114 towards the conductor 106.

Figure 6A:
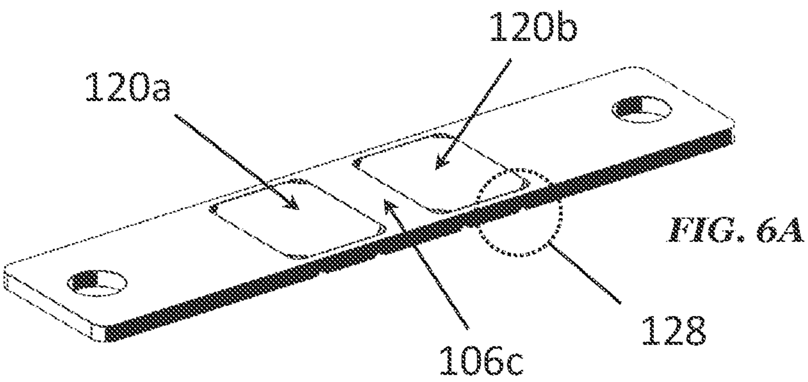
FIG. 6A illustrates a perspective view of the conductor when the current conduction path is defined along the conductor.

FIG. 6A illustrates the conductor 106 when the movable member 112 is in the first position. In particular, the conductor 106 comprises two insert conductors 120*a*, 120*b* arranged in respective switching regions 108*a* 108*b*, with four shearable portions 122 respectively arranged between an edge of each hole 124 and a nearest respective side of the conductor. In this arrangement, a current conduction path is defined along the length 116 of the conductor via the insert conductors and the shearable portions of each switching region and current can flow across the whole width 118 of the conductor.

Figure 6B:
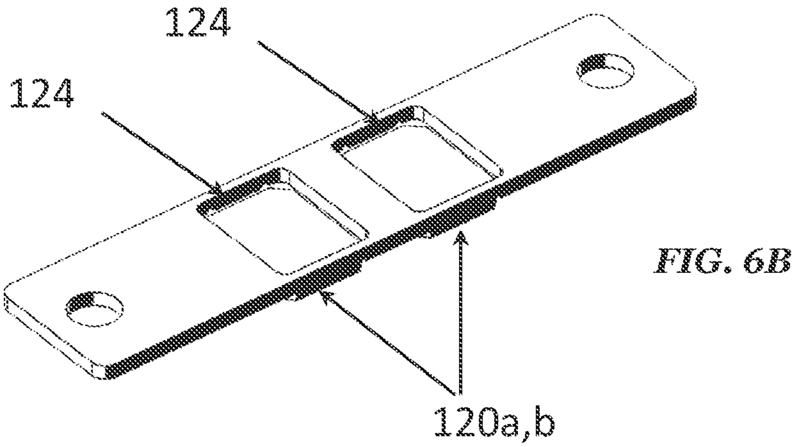
FIG. 6B illustrates an intermediate perspective view of the conductor during operation of the switch of FIG. 1.

Once the actuator 102 is activated (either by ignition or by other electrical or mechanical means, as appropriate), a force acts on the movable member 112 to move the moveable member along direction 114 towards the conductor 106. As illustrated in FIG. 6B, as the movable member is actuated the first end portion (or portions, depending on the configuration of the moveable member) 130 of the extensions 112*a*, 112*b* of the movable member contact the conductor 106 in the respective switching regions 108*a*, 108*b*. In particular, the first end portions 130, arranged at the end of each extension, each contact an insert conductor 120*a*, 120*b* and begin to displace the respective insert conductors 120 from the respective holes 124 as the movable member is actuated. In this arrangement, a current conduction path is still defined along the length 116 of the conductor via the shearable portions of each switching region, but current may no longer flow across the whole width 118 of the conductor due to the presence of holes 124 in the conductor 106. The resistance of the conductor 106 may therefore be increased in the switching regions due to the smaller cross sectional area of the shearable portions 122 as compared to the conductor 106 as a whole.

Figure 6C:
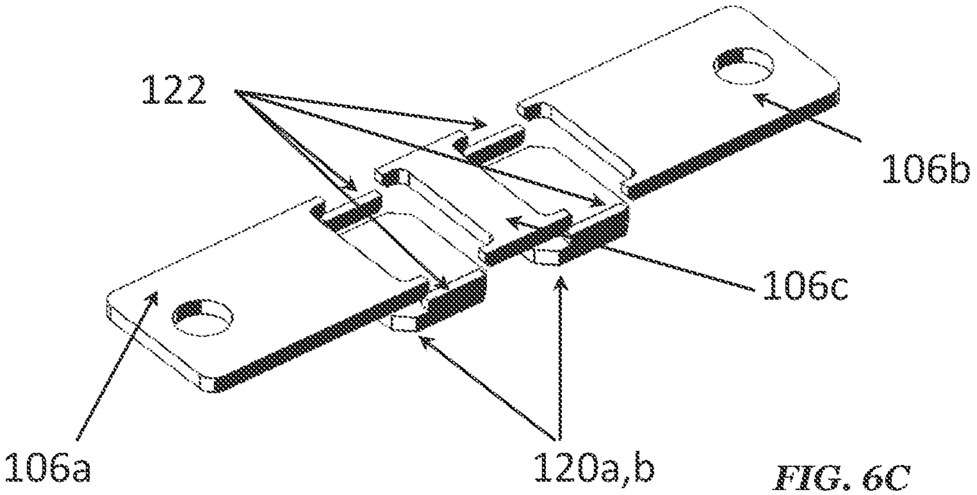
FIG. 6C illustrates a perspective view of the conductor when the current conduction path is opened.

As illustrated in FIG. 6C, once the insert conductors are at least partially displaced from the respective holes 124 through the conductor 106 (optionally fully displaced), the second end portion (or portions, depending on the configuration of the moveable member) 132 of the two extensions of the movable member 112 contact the shearable portions 122 of the respective switching regions 108*a*, 108*b*. In this embodiment, each extension comprises two second end portions 132, one to contact each shearable portion 122 of each switching region 108. Continued actuation of the moveable member causes force to be applied to each of the shearable portions. Once the insert conductors have been (at least partially) removed or displaced from the holes 124, the mechanical strength of the conductor 106 in the switching regions is reduced (since the cross-sectional area of the main body of the conductor 106 is less in the switching region 108 than outside the switching region). The combination of downward force from the movable member in direction 114, optionally combined with an upward force from portion 110*b* of the housing 110 on which conductor 106 is in some arrangements supported, acts to shear the conductor 106 at the edges of the thinner (and thus weaker) shearable portions 122; the shearable portions can thus be broken away from the main body of the conductor by the movement of the moveable member 112 in order to break the current conduction path, such that no current can flow between the two ends of the conductor 106.

The bottom portion of the housing 110*b* described herein is configured to receive the moveable member 112, along with the insert conductors 120 and the (now sheared/broken) shearable portions 122. The housing 110*b* can comprise a cavity or open space, and the moveable member 112 can be actuated until the base 136 of the switch is reached by the ends portions, wherein at least part of the moveable member 112 is located within the cavity of the bottom part or portion 110*b* of the housing. It will be understood that the depth of this cavity/open space for receiving the moveable member, and the size of the moveable member itself, will affect the dimensions of the switch 100.

The moveable member 112 actuates the loose parts of the conductor in direction 114 as it moves, and can also act as a stopper, or stop, to prevent the insert conductor 120 and the broken off shearable portions from subsequently moving around the switch. In some examples, the housing and/or moveable member may be configured so that the moveable member 112 is retained within the bottom portion of the housing, for example by a catch mechanism. An example of such a catch mechanism can be seen in FIG. 10, where a portion of the catch mechanism is highlighted by circle 150. This approach can facilitate mounting of the switch 100 in any suitable orientation.

In some arrangements, the at least one shearable portion 122 is further bounded by one or more notched portions 128 of the conductor 106, the notched portions extending in a direction across the width 118 of the conductor. In the examples shown in FIGS. 5 and 6A (see for example, the example notches or notched portions within the dotted circles), the notched portions 128 extend from a side of the conductor to a the nearest edge of the hole 124, and define an edge of the shearable portion. In other words, the shearable portion 122 is the region of conductor between a side of the conductor, an edge of the hole 124 and the two notched portions 128 (for example, as illustrated for conductor portion 122*a* in FIG. 2B). Since the cross sectional area of the conductor 106 is thinner at the notched portions 128, the conductor shears at the notched portions 128 at the edge of the shearable portion 122, causing the shearable portion to fall away from the main body of conductor 106.

For higher current rating applications, the conductor size (i.e. the cross-sectional area of the conductor) has to increase to provide the requisite current carrying capacity. This results in the requirement for higher forces to shear or break the conductor, and hence there is a need for higher capacity pyrotechnic actuators (or other linear actuators) to provide the necessary shear force. This also places higher demands on the structural strength of the switch, so larger switches are needed to be able to safely sustain the higher forces generated. By shearing the conductor 106 at the location where the cross-section of the conductor is narrowed purposefully (by the introduction of hole 124 through the conductor), less force is needed to break (shear) the conductor as compared with shearing of a continuous conductor 106 (whilst still allowing for suitable current carrying capabilities through the use of insert conductors). In some arrangements, the insert conductors 120 are completely displaced from the respective holes 124 before shearing of the edges of the shearable portion begins (i.e. before the second end portions contact the respective shearable portions), which may further decrease the force required to shear the conductor 106. The use of notched portions 128 may decrease the shear force still further.

A smaller actuator, and thus a smaller switch, may therefore be provided by use of the arrangement described herein.

The breaking of the temporary joint or join (from the press fit or solder/adhesive, as appropriate) between the conductor 106 and the insert conductors 120 and the subsequent shearing (or breaking) of the edges of the shearable portions 122 can lead to the formation of an electrical arc between the respective ends of the main body of conductor 106 and the insert conductors 122 and/or shearable portions 122 as the current path opens. An electrical arc can be formed between the ends of a conductor whenever conductors physically separate from one another. The linear displacement of part of the conductor from the main body can itself facilitate a reduction in this electric arc (or arc discharge) by rapidly stretching the arc, thereby increasing the arc resistance. An increased arc resistance causes a corresponding increase in arc voltage and a decrease in arc current. The speed of displacement, which occurs due to the dynamic nature of the force applied by the pyrotechnic actuator (or other actuator type), can act to increase the physical separation of the respective conductors quicker than with previous linear approaches, leading to more effective interruption of the electrical arc.

Moreover, by breaking the current carrying conductor 106 at four places, in series, the linear displacement of the insert conductors 120 and the shearable portions 122 relative to the main body of the conductor 106 can lead to the formation of four different arc columns (in this example embodiment). By creating multiple arc columns the arc voltage can be increased quicker, and the severity of each arc reduced (since the electrical discharge is distributed across the different arc columns). A safer and more robust switch may be provided. It will be appreciated that the number of series conductor breaks, and thus the effect on arc reduction, can be increased or decreased by increasing or decreasing the number of switching regions, and thus the number of conductor inserts. The length of the extensions 112*a*, 112*b* can be configured to provide the appropriate arc suppression effect, having regard to the rating of the switch 100. The switch 100 can thus be tailored to particular current ratings.

Arc interruption or extinguishing can be further improved through the use of arc extinguishing media. In this arrangement, a store of arc extinguishing media can be arranged in the void around the moveable member 112. As the moveable member is displaced upon (i.e. in response to) actuation of the actuator 102, the media is correspondingly displaced to fill the gap vacated by the moveable member. Alternatively, in other groups of embodiments, an arc extinguishing media element may be provided which is coupled to the insert conductor(s) 120 and arranged to be moved into the hole(s) 124 as the insert conductor(s) are displaced. For example, an arc extinguishing media element may be coupled to a surface of the insert conductors nearest the moveable member, and the moveable member may indirectly contact the insert conductor via said element. It will be understood that the arc extinguishing media can be provided in any other suitable arrangement to facilitate interruption or extinguishing of the electric arc. In this group of embodiments, the arc extinguishing media comprises silica. The silica media can be provided in any suitable form, for example as a liquid, powder or other solid, or as a thick, viscous, semi-solid liquid. However, it will be understood that the arc extinguishing media can comprise silica in any suitable form. Alternatively, any other suitable arc extinguishing media may be used.

Figure 9A:
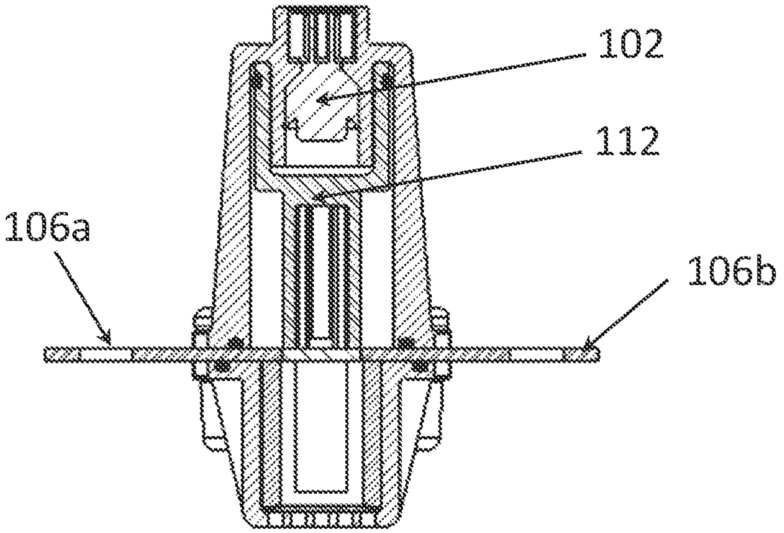
FIG. 9A shows a schematic cross section of a switch in accordance with an embodiment of the first aspect, where the switch is in a closed position and a current conduction path is defined through the switch.
Figure 9B:
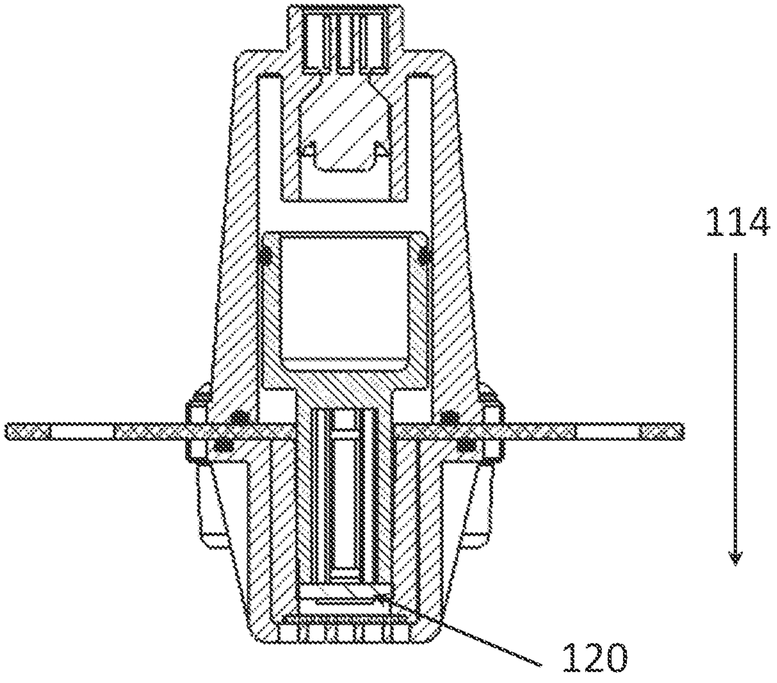
FIG. 9B shows a schematic cross section of the switch in an open position, where no current conduction path is defined through the switch.
Figure 10:
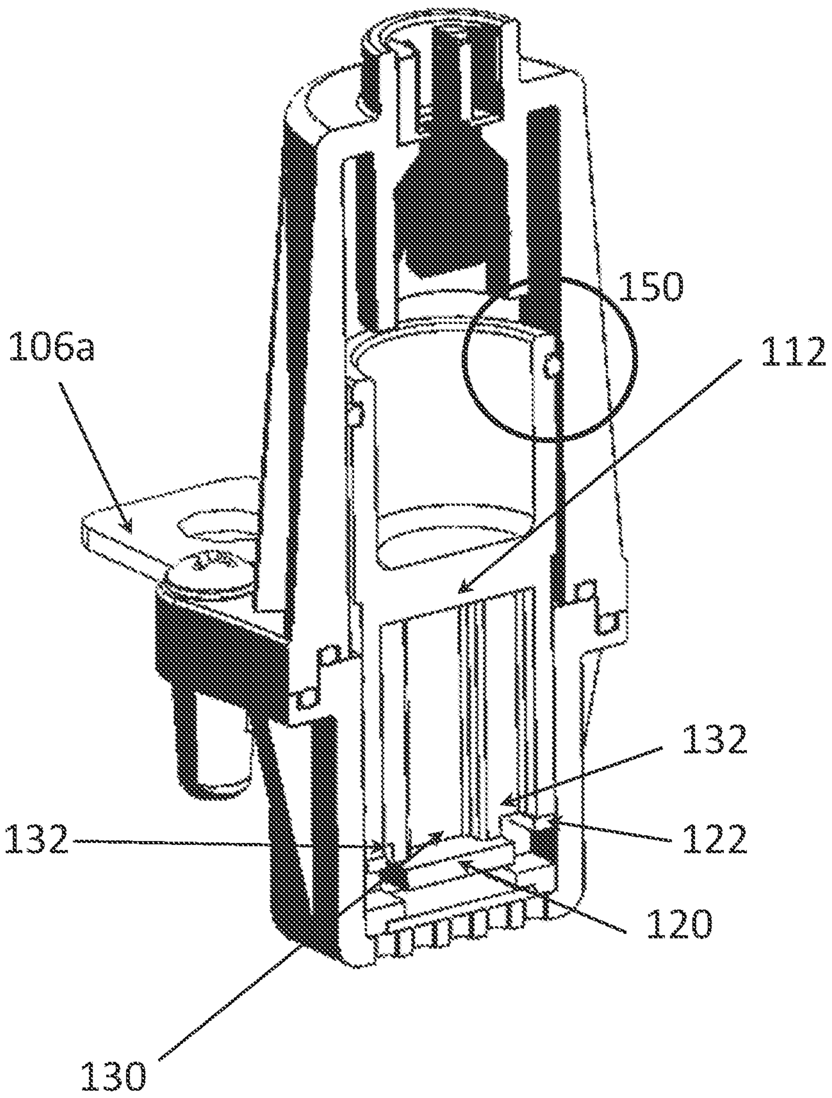
FIG. 10 illustrates a perspective view of a cross section of the switch of FIG. 9B.

An example arrangement with a single insert conductor 120 can be seen in FIGS. 9A and 9B, and in FIG. 10. The principles described above with respect to switch 100 with two insert conductors apply equally to the switch 100 with one insert conductor, and it will be understood that three, or three or more insert conductors may alternatively be provided, as appropriate. FIG. 9A illustrates the switch 100 when the movable member is in a first position, in which position a current conduction path is defined along a length of the conductor 106 (having connection contacts 106*a*, 106*b*). When the moveable member 112 is in the second position (see e.g. FIGS. 9B and 10), the current conduction path is broken by removal of the insert conductor 120 from the main body of the conductor and by the shearing of the one or more shearable portions 122, as described above. The moveable member 112 may retain the insert conductor 120 and the shearable portion(s) within a cavity in a base of the housing by means of a catch mechanism (see for example the highlighted section 150 of FIG. 10).

As can be seen from FIG. 10, moveable member 112 comprises a single extension having one first end portion 130 and two second end portions 132. However, it will be understood that more than one end portion 120 may be provided, and one or more second end portions 132 may be provided, depending on the location and number of the shearable portions 122. The first end portion(s) 130 protrude further along direction 114 than the second end portion(s) 132 such that, upon actuation of the movable member 112, the first end portion contacts conductor 106 at a switching region of the conductor before the second end portion contacts the conductor 106 at the switching region.

Actuator 102 actuates the moveable member 112 to move it from the first position towards the second position in a direction of movement 114 towards the base of the switch (where, in the second position, the extensions of movable member 112 are at or near the base of the switch). The actuator 102 can be arranged to apply a linear force in a direction substantially parallel to the direction of movement 114, or any other suitable force in any other suitable direction, to move the moveable member in direction 114 from the first position. In some examples, the actuator is a pyrotechnic actuator arranged to release gas into an ignition chamber (optionally formed from or at least partially defined by the moveable member 112) in a direction substantially parallel to the direction of movement 114 of the moveable member to actuate the moveable member 112.

Figure 7A:
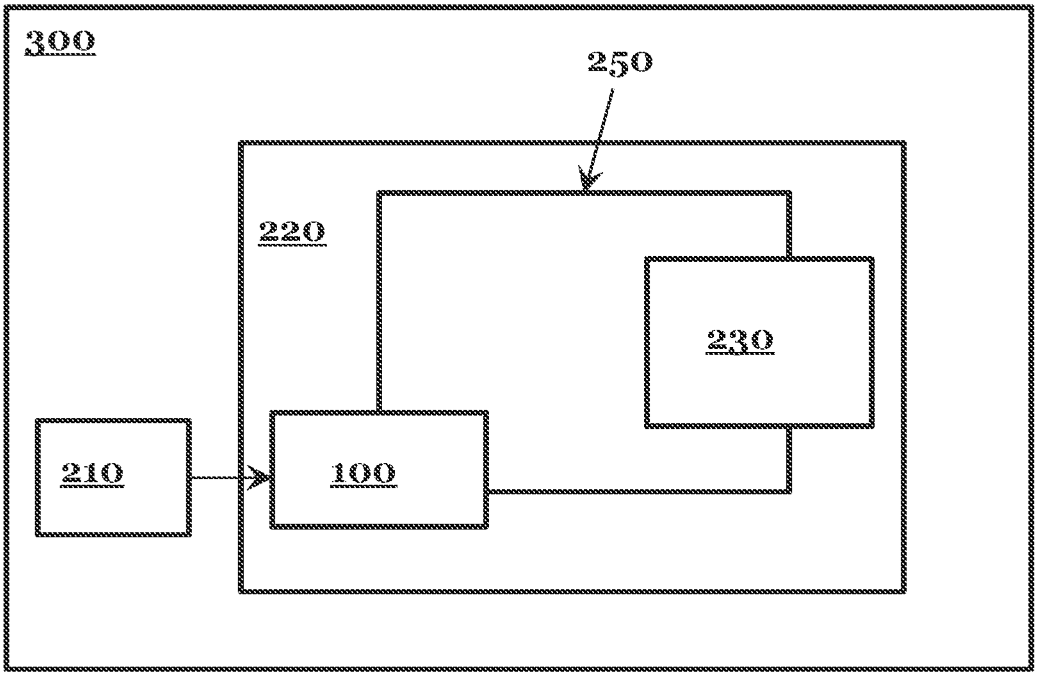
FIGS. 7A and 7B illustrate a vehicle comprising the switch of the first aspect.
Figure 7B:
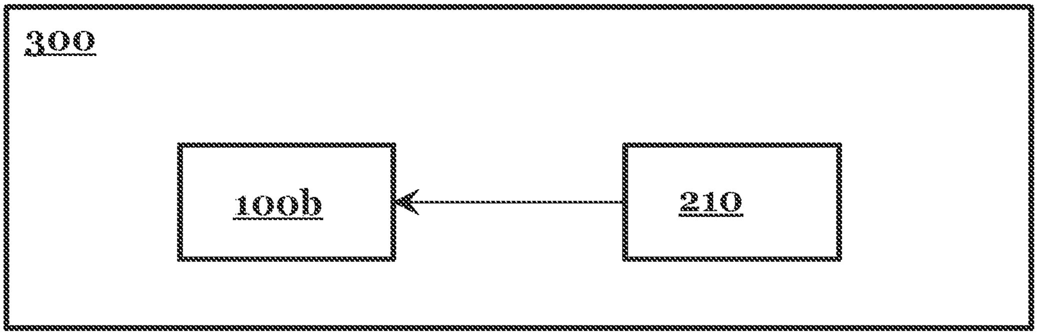

With reference to FIG. 7, example uses of switch 100 are described. In the example of FIG. 7A, switch 100*a* is incorporated within a powertrain 220. In particular, powertrain 220 can be a powertrain for a vehicle 300; in regard to a vehicle (e.g. a motor vehicle, a ship or boat, or a plane, etc.), a powertrain encompasses the main components that generate power and deliver it to the road surface, water, or air. This includes the engine, transmission, drive shafts, and the drive wheels (or other drive mechanism, such as a propeller). In an electric or hybrid vehicle, the powertrain 220 also includes battery 230 and an electric motor, for example. Switch 100 may be connected, via the connection contacts 106*a*, 108*a* of the first and second conductors, to an electrical circuit 250 within vehicle 300, which electrical circuit may optionally include the battery 230. Alternatively, in the example of FIG. 7B, switch 100 is employed for another use within vehicle 300, which may be an electrical vehicle.

In both FIGS. 7A and 7B, an ignition signal may be provided to connector pins 102*a* of the pyrotechnical actuator 102 from a remote controller, or a remote power distribution unit, 210 within the vehicle 300. Such an ignition signal may be issued in response to an external event. For example, when the switch 100 is connected to a battery 230 installed in the vehicle 300, an ignition signal may be sent to the pyrotechnic actuator 102 in response to a collision of the vehicle; activation of the charge inside the igniter 102*b* can cause the third conductor 110 to be separated from the first and second conductors in order to open the electrical circuit 250 and prevent the flow of current through the battery 230. Such an arrangement can improve safety in the event of a collision. Alternatively, switch 100 and remote controller 210 can form a system which can be deployed in any other application where such breaking of a circuit is required.

Figure 8:
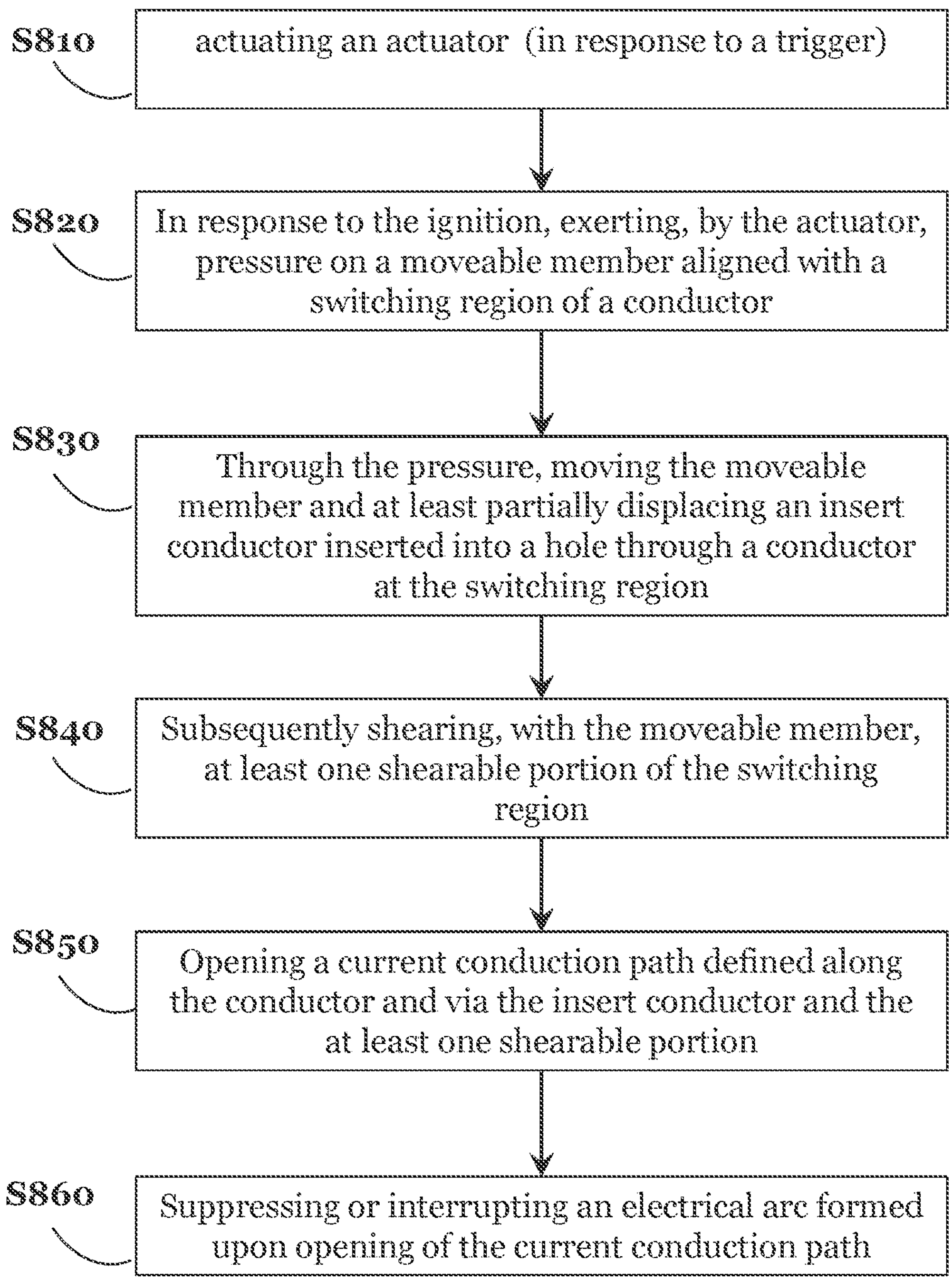
FIG. 8 illustrates a method in accordance with the second aspect.

With reference to FIG. 8, a method 800 for opening a current conduction path using a switch 100 (for example, the switch 100 of the first aspect) is described.

At step 810, the method comprises actuating an actuator, optionally in response to a collision or other external event triggering an initiation signal. Actuating the actuator optionally comprises igniting a pyrotechnic actuator, which ignition can be in response to a collision or other external event triggering an initiation signal which is received by the pyrotechnic actuator. Any other trigger can be used for actuating the actuator, depending on the application of the switch 100.

Upon actuation of the actuator, at step 820, pressure is exerted (either directly or indirectly) on a moveable member 112. Optionally, the pressure is from high-pressure gas released into the ignition chamber upon actuation of a pyrotechnic actuator. This released gas exerts a pressure (either directly or indirectly) on the moveable member. The moveable member is aligned with a switching region (108) of a conductor (106), and arranged to move in a first direction (114) toward the switching region upon actuation by the actuator, i.e. in response to the pressure exerted at step 820. Optionally, the moveable member is accelerated downwards due to the high pressure gases released by the pyrotechnic actuator, or from another form of dynamic actuation or may simply be forced continually downwards by another form of (optionally linear) actuator.

At step 830, as the moveable member is pushed in direction 114 by the actuator 102, a first end portion (130) of the moveable member begins to displace an insert conductor (120) inserted into a hole (124) through the conductor at the switching region. After the insert conductor is at least partially displaced, at step 840 a respective second end portion of the moveable member (which protrudes less far in direction 114 than the first end portion such that it contacts the switching region later in time than the first end portion) contacts at least one shearable portion of the switching region, the at least one shearable portion bounded by the hole and a nearest of the two sides of the conductor.

As the moveable member is pushed further in direction 114, at step 840 the moveable member 112 begins shearing, with the respective second end portion (132) of the moveable member, the edges of the at least one shearable portion of the switching region. As the edges of the at least one shearable portion are sheared, the shearable portion(s) are broken away from, and thus fall away from, the main body of conductor 106 by the actuating force. The insert conductors and the shearable portions are correspondingly moved, i.e. displaced, away from the conductor 106 by the moveable member; this displacing of the insert conductor(s) and the subsequent shearing of the at least one shearable portion at step 840, in response to the pressure exerted at step 820, causes opening of the current conduction path (step 850).

Optionally, at step 860, an electrical arc is formed upon the breaking of the conductor by the shearing of the at least one shearable portion. This arc can be suppressed or interrupted, which interruption may be achieved solely by the movement of the insert conductor and the shearable portions relative to the conductor 106, which lengthens the arc and divides it into multiple columns, thereby reducing its severity, or by the release of arc extinguishing media, for example, a media comprising silica, which can act to cool (and thus interrupt) the electrical arc.

It is noted herein that while the above describes various examples of the isolating switch of the first aspect, these descriptions should not be viewed in a limiting sense. Rather, there are several variations and modifications which may be made without departing from the scope of the present invention as defined in the appended claims.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A switch, comprising:
- an actuator;
- a conductor having a length extending between two ends and a width extending between two sides, the conductor having a connection contact at each of the two ends and at least one switching region disposed between the connection contacts, each switching region of the at least one switching region extending between the two sides of the conductor and comprising:
  - a hole through the conductor,
  - at least one shearable portion bounded by the hole and a nearest of the two sides of the conductor, and
  - an insert conductor inserted into the hole and in electrical contact with the conductor, via the hole, such that a current conduction path is defined along the length of the conductor via the insert conductor and the at least one shearable portion of each switching region of the at least one switching region; and
- a moveable member aligned with the at least one switching region and arranged to move in a first direction toward the at least one switching region upon actuation by the actuator,
- wherein, when the moveable member moves in the first direction, the moveable member is configured to at least partially displace the insert conductor from the hole with a first end portion of the moveable member and then shear the at least one shearable portion of the conductor with a respective second end portion of the moveable member in order to break the current conduction path, and
- wherein the first end portion extends farther in the first direction than the respective second end portion.

2. The switch of claim 1, wherein the actuator is a pyrotechnic actuator, and
- wherein the switch further comprises an ignition chamber, the pyrotechnic actuator arranged to release gas into the ignition chamber upon ignition to actuate the moveable member.

3. The switch of claim 2, wherein the moveable member comprises a void which at least partially defines the ignition chamber.

4. The switch of claim 1, wherein the moveable member is configured such that the first end portion fully displaces the insert conductor from the respective hole before the second end portion contacts the at least one shearable portion of each switching region of the at least one switching region.

5. The switch of claim 1, wherein the at least one switching region comprises two switching regions separated from one another along the length of the conductor.

6. The switch of claim 5, wherein the switch further comprises a housing arranged to enclose at least the two switching regions, and wherein a portion of the conductor between the two switching regions member is supported by the housing.

7. The switch of claim 5, wherein the moveable member comprises two extensions, each extension of the two extensions being aligned with a respective one of the two switching regions, the first end portion and the second end portion being arranged at an end of each of the two extensions.

8. The switch of claim 1, wherein the at least one shearable portion is further bounded by one or more notched portions of the conductor, the one or more notched portions extending in a direction across the width of the conductor.

9. The switch of claim 1, where the at least one shearable portion has a cross sectional area smaller than a cross sectional area of the conductor outside of the at least one switching region.

10. The switch of claim 1, wherein the at least one switching region comprises two shearable portions, one disposed to either side of the hole.

11. The switch of claim 1, wherein the insert conductor is retained in the hole by interference fit or press fit.

12. The switch of claim 1, wherein the insert conductor is retained in the respective hole with solder and/or electrically conductive adhesive.

13. A system, comprising:

the switch of claim 1; and a controller arranged to provide a signal to the actuator.

14. A vehicle, comprising:

the switch of claim 1, wherein the vehicle is an electric vehicle.

15. A method for operating a switch, comprising:

actuating an actuator;

exerting, by the actuator, pressure on a moveable member aligned with a switching region of a conductor, the switching region extending between two sides of the conductor, the moveable member arranged to move in a first direction toward the switching region upon actuation by the actuator;

at least partially displacing, with a first end portion of the moveable member, an insert conductor inserted into a hole through the conductor at the switching region;

shearing, with a respective second end portion of the moveable member, at least one shearable portion of the switching region, the at least one shearable portion bounded by the hole and a nearest of the two sides of the conductor, the first end portion extending farther in the first direction than the respective second end portion; and opening a current conduction path defined along a length of the conductor via the insert conductor and the at least one shearable portion by the displacement of the insert conductor and the shearing of the at least one shearable portion.

* * * * *